United States Patent
Chen et al.

(10) Patent No.: US 10,573,016 B2
(45) Date of Patent: Feb. 25, 2020

(54) DEVICE CAPABLE OF CORRECTING WRONG NORMAL VECTORS OF AN ORIGINAL THREE-DIMENSIONAL SCAN RESULT AND RELATED METHOD THEREOF

(71) Applicant: eYs3D Microelectronics, Co., Taipei (TW)

(72) Inventors: Tzu-Hung Chen, Kaohsiung (TW); Yu-En Huang, Kaohsiung (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/987,925

(22) Filed: May 24, 2018

(65) Prior Publication Data

US 2018/0342076 A1 Nov. 29, 2018

(30) Foreign Application Priority Data

May 24, 2017 (TW) .............................. 106117268 A

(51) Int. Cl.
*G06T 7/00* (2017.01)
*G06T 7/593* (2017.01)
(Continued)

(52) U.S. Cl.
CPC ................ *G06T 7/593* (2017.01); *G06T 7/97* (2017.01); *H04N 13/128* (2018.05);
(Continued)

(58) Field of Classification Search
CPC . G06T 2207/10008; G06T 2207/10012; G06T 7/593; G06T 7/97; H04N 13/128;
(Continued)

(56) References Cited

U.S. PATENT DOCUMENTS

| | | | | |
|---|---|---|---|---|
| 2007/0268291 | A1* | 11/2007 | Naoi | G06T 15/405 345/422 |
| 2016/0061954 | A1* | 3/2016 | Walsh | G01S 17/89 356/139.03 |
| 2016/0203636 | A1* | 7/2016 | Huang | G06T 17/00 345/419 |

OTHER PUBLICATIONS

Andrea Tagliasacchi, Hao Zhang and Daniel Cohen-Or, "Curve Skeleton Extraction from Incomplete Point Cloud," ACM Transactions on Graphics, vol. 27, No. 3 Article 71, Publication Date: Aug. 2009. (Year: 2009).*

* cited by examiner

*Primary Examiner* — Sing-Wai Wu
(74) *Attorney, Agent, or Firm* — Winston Hsu

(57) ABSTRACT

A device capable of correcting wrong normal vectors of an original three-dimensional scan result includes a normal vector generation unit and a correction unit, wherein the original three-dimensional scan result corresponds to an object. The normal vector generation unit is used for generating a normal vector corresponding to each point of the original three-dimensional scan result according to the each point of the original three-dimensional scan result and a plurality of predetermined points of the original three-dimensional scan result adjacent to the each point of the original three-dimensional scan result. The correction unit is coupled to the normal vector generation unit for determining an inner region of the original three-dimensional scan result, and reversing a normal vector corresponding to a point of the original three-dimensional scan result when the normal vector corresponding to the point is toward the inner region of the original three-dimensional scan result.

11 Claims, 12 Drawing Sheets

(51) Int. Cl.
*H04N 13/204* (2018.01)
*H04N 13/128* (2018.01)
*H04N 13/271* (2018.01)
*H04N 13/239* (2018.01)
*H04N 13/00* (2018.01)

(52) U.S. Cl.
CPC ......... *H04N 13/204* (2018.05); *H04N 13/239* (2018.05); *H04N 13/271* (2018.05); *G06T 2207/10008* (2013.01); *G06T 2207/10012* (2013.01); *H04N 2013/0081* (2013.01)

(58) Field of Classification Search
CPC .. H04N 13/204; H04N 13/239; H04N 13/271; H04N 2013/0081
See application file for complete search history.

DEVICE CAPABLE OF CORRECTING WRONG NORMAL VECTORS OF AN ORIGINAL THREE-DIMENSIONAL SCAN RESULT AND RELATED METHOD THEREOF

BACKGROUND OF THE INVENTION

1. Field of the Invention

The present invention relates to a device capable of correcting wrong normal vectors of an original three-dimensional scan result and a related method thereof, and particularly to a device and a related method thereof that can reverse a normal vector corresponding to a point of an original three-dimensional scan result when the normal vector corresponding to the point is toward an inner region of the original three-dimensional scan result.

2. Description of the Prior Art

After a stereo scanner utilizes visible light to scan an object (e.g. an owl toy) to generate a three-dimensional scan result SR corresponding to the object, the stereo scanner can generate a normal vector corresponding to each point of the three-dimensional scan result SR according to the each point of the three-dimensional scan result SR and a plurality of predetermined points adjacent to the each point (as shown in FIG. 1, FIG. 1 only shows a normal vector corresponding to each point of a partial cross section SSR of the three-dimensional scan result SR), wherein as shown in FIG. 1, the normal vector corresponding to the each point of the partial cross section SSR is toward an outside region OSR of the three-dimensional scan result SR, and the three-dimensional scan result SR is generated according to reflection light (corresponding to the visible light) from a surface of the object. Thereof, because the normal vector corresponding to the each point of the partial cross section SSR is toward the outside region OSR of the three-dimensional scan result SR, reflection light corresponding to the each point of the partial cross section SSR will be correct to show a corresponding color thereof. However, because when the stereo scanner generates a normal vector corresponding to each point of the three-dimensional scan result SR according to the each point of the three-dimensional scan result SR and a plurality of predetermined points adjacent to the each point of the three-dimensional scan result SR, normal vectors of partial points of another partial cross section ASSR of the three-dimensional scan result SR may be toward an inner region ISR of the three-dimensional scan result SR (for example, as shown in FIG. 2, a normal vector of each point within a circle A is toward the inner region ISR of the three-dimensional scan result SR), the partial points (the each point within the circle A) of the partial cross section ASSR do not generate corresponding reflection light, resulting in the partial points of the partial cross section ASSR showing abnormal colors. For example, as shown in FIG. 3, when a normal vector of each point of a region HA of the three-dimensional scan result SR corresponding to the owl toy is toward the inner region ISR of the three-dimensional scan result SR, the region HA will show a black color. Thereof, how to correct wrong normal vectors of the three-dimensional scan result SR becomes an important issue of a designer of the stereo scanner.

SUMMARY OF THE INVENTION

An embodiment of the present invention provides a device capable of correcting wrong normal vectors of an original three-dimensional scan result, wherein the original three-dimensional scan result corresponds to an object. The device includes a normal vector generation unit and a correction unit. The normal vector generation unit is used for generating a normal vector corresponding to each point of the original three-dimensional scan result according to the each point and a plurality of predetermined points adjacent to the each point. The correction unit is coupled to the normal vector generation unit for determining an inner region of the original three-dimensional scan result, and reversing a normal vector corresponding to a point of the original three-dimensional scan result when the normal vector corresponding to the point is toward the inner region.

Another embodiment of the present invention provides a method of correcting wrong normal vectors of an original three-dimensional scan result, wherein a device applied to the method includes a normal vector generation unit and a correction unit. The method includes the normal vector generation unit generating a normal vector corresponding to each point of the original three-dimensional scan result according to the each point and a plurality of predetermined points adjacent to the each point; the correction unit determining an inner region of the original three-dimensional scan result; the correction unit reversing a normal vector corresponding to a point of the original three-dimensional scan result when the normal vector corresponding to the point is toward the inner region; and the correction unit generating and outputting a corrected three-dimensional scan result after the correction unit reverses normal vectors corresponding to a plurality of points of the original three-dimensional scan result, wherein the normal vectors corresponding to the plurality of points are toward the inner region.

The present invention provides a device capable of correcting wrong normal vectors of an original three-dimensional scan result and a related method thereof. The device and the method utilize a normal vector generation unit to generate a normal vector corresponding to each point of the original three-dimensional scan result according to the each point and a plurality of predetermined points adjacent to the each point after an image processor generates the original three-dimensional scan result corresponding to an object, and utilize a correction unit to reverse a normal vector corresponding to a point of the original three-dimensional scan result when the normal vector corresponding to the point is toward an inner region of the original three-dimensional scan result. Thereof, after the correction unit corrects wrong normal vectors of the original three-dimensional scan result, the correction unit can generate and output a corrected three-dimensional scan result. Because the correction unit can correct the wrong normal vectors of the original three-dimensional scan result, compared to the prior art, the present invention can make reflection light of the corrected three-dimensional scan result be correct to show a corresponding color of the corrected three-dimensional scan result These and other objectives of the present invention will no doubt become obvious to those of ordinary skill in the art after reading the following detailed description of the preferred embodiment that is illustrated in the various figures and drawings.

DETAILED DESCRIPTION

Figure 4:
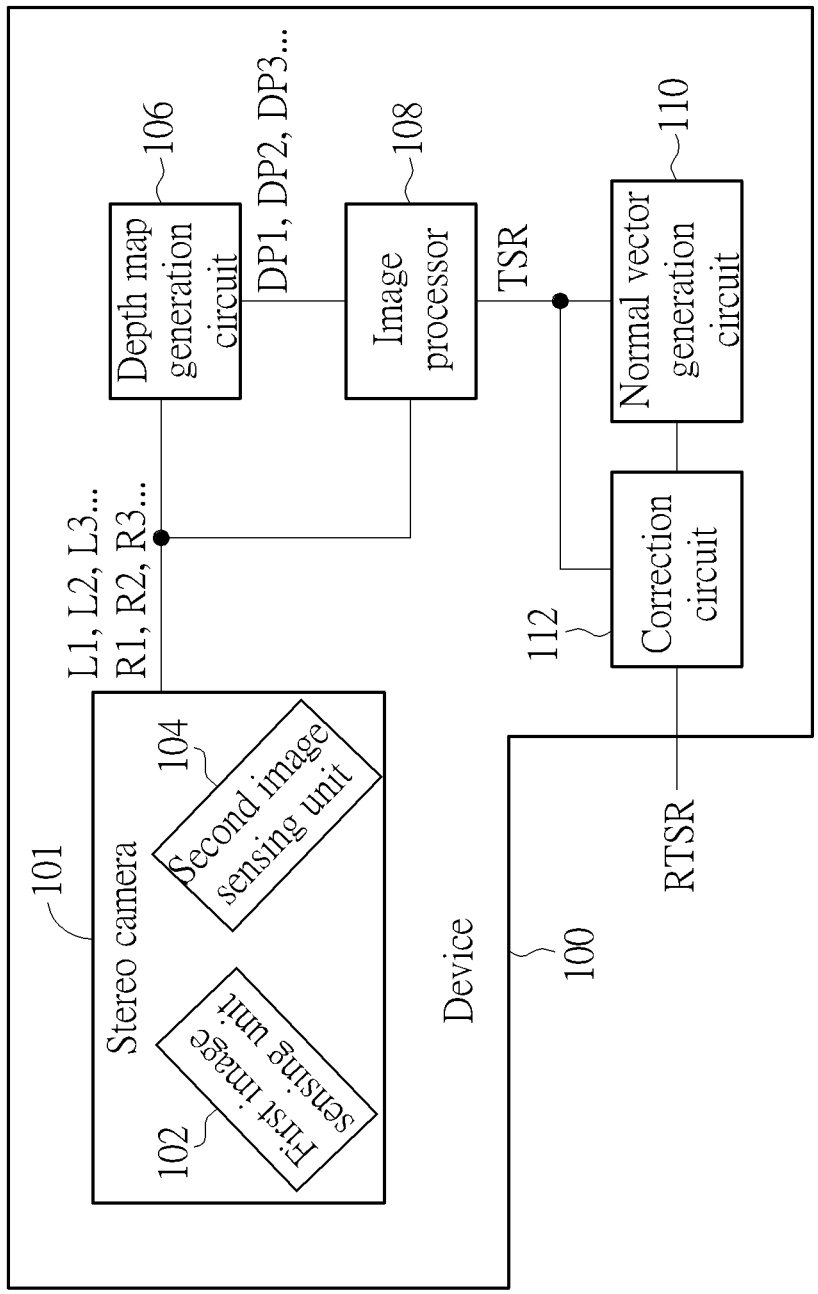
FIG. 4 is a diagram illustrating a device capable of correcting wrong normal vectors of an original three-dimensional scan result according to a first embodiment of the present invention.
Figure 5:
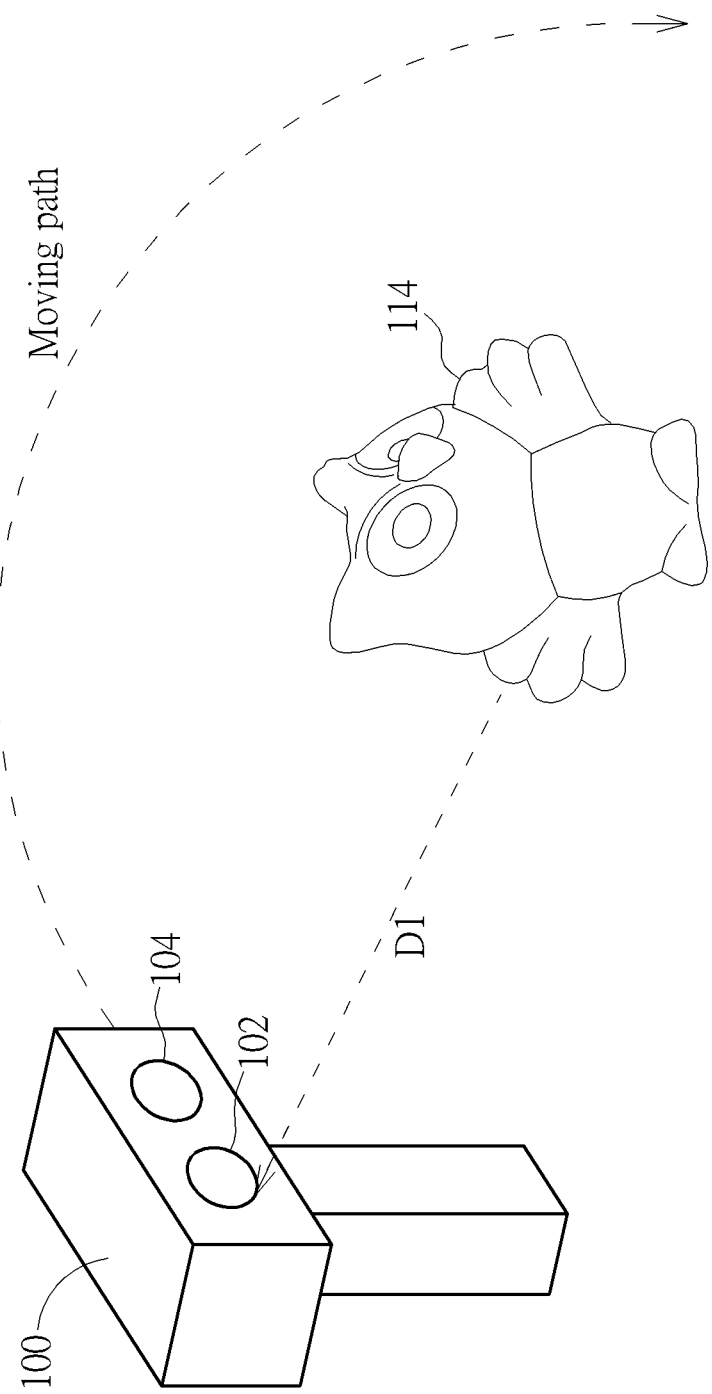
FIG. 5 is a diagram illustrating the device scanning the object.

Please refer to FIG. 4. FIG. 4 is a diagram illustrating a device 100 capable of correcting wrong normal vectors of an original three-dimensional scan result according to a first embodiment of the present invention. As shown in FIG. 4, the device 100 includes a first image sensing unit 102, a second image sensing unit 104, a depth map generation unit 106, an image processor 108, a normal vector generation unit 110, and a correction unit 112, wherein the first image sensing unit 102 and the second image sensing unit 104 can be optionally included in a stereo camera 101, the depth map generation unit 106 and the image processor 108 are coupled to the first image sensing unit 102 and the second image sensing unit 104, and the normal vector generation unit 110 is coupled between the image processor 108 and the correction unit 112. In addition, it is obvious to one of ordinary skill in the art that each of the first image sensing unit 102 and the second image sensing unit 104 at least includes a lens and charge coupled device (CCD) (or CMOS image sensor). In addition, the present invention is not limited to the device 100 only including the first image sensing unit 102 and the second image sensing unit 104, that is, the device 100 can include at least two image sensing unit. When the device 100 scans an object 114 (as shown in FIG. 5, the object 114 is an owl toy), the first image sensing unit 102 captures a plurality of first images L1, L2, L3, . . . including the object 114, and the second image sensing unit 104 captures a plurality of second images R1, R2, R3, . . . including the object 114, wherein each first image (e.g. the first image L1) of the plurality of first images L1, L2, L3, . . . corresponds to a second image (e.g. the second image R1) of the plurality of second images R1, R2, R3, . . . , the device 100 is not limited to an appearance shown in FIG. 5, the plurality of first images L1, L2, L3, . . . and the plurality of second images R1, R2, R3, . . . are RGB images or YUV images, and the plurality of first images L1, L2, L3, . . . are left eye images and the plurality of second images R1, R2, R3, . . . are right eye images. But, the present invention is not limited to the plurality of first images L1, L2, L3, . . . and the plurality of second images R1, R2, R3, . . . being RGB images or YUV images. That is to say, the plurality of first images L1, L2, L3, . . . and the plurality of second images R1, R2, R3, . . . can be other types of color images. As shown in FIG. 4, after the depth map generation unit 106 receives the plurality of first images L1, L2, L3, . . . and the plurality of second images R1, R2, R3, . . . , the depth map generation unit 106 can process the first image L1 and the second image R1 corresponding to the first image L1 together to generate a depth map DP1. Thus, the depth map generation unit 106 can generate a plurality of depth maps DP1, DP2, DP3, . . . according to the plurality of first images L1, L2, L3, . . . and the plurality of second images R1, R2, R3, . . . . As shown in FIG. 5, because the device 100 scans the object 114, the plurality of depth maps DP1, DP2, DP3, . . . can correspond to different view angles. As shown in FIG. 4, the image processor 108 is used for generating an original three-dimensional scan result TSR corresponding to the object 114 according to the plurality of first images L1, L2, L3, . . . , the plurality of second images R1, R2, R3, . . . , and the plurality of depth maps DP1, DP2, DP3, . . . , wherein the original three-dimensional scan result TSR is a color three-dimensional scan result. But, in another embodiment of the present invention, the image processor 108 generates a part of the original three-dimensional scan result TSR corresponding to the object 114 in real time according to each first image (e.g. the first image L1) of the plurality of first images L1, L2, L3, . . . , a corresponding second image (e.g. the second image R1) of the plurality of second images R1, R2, R3, . . . , and a corresponding depth map (e.g. the depth map DP1).

Figure 6:
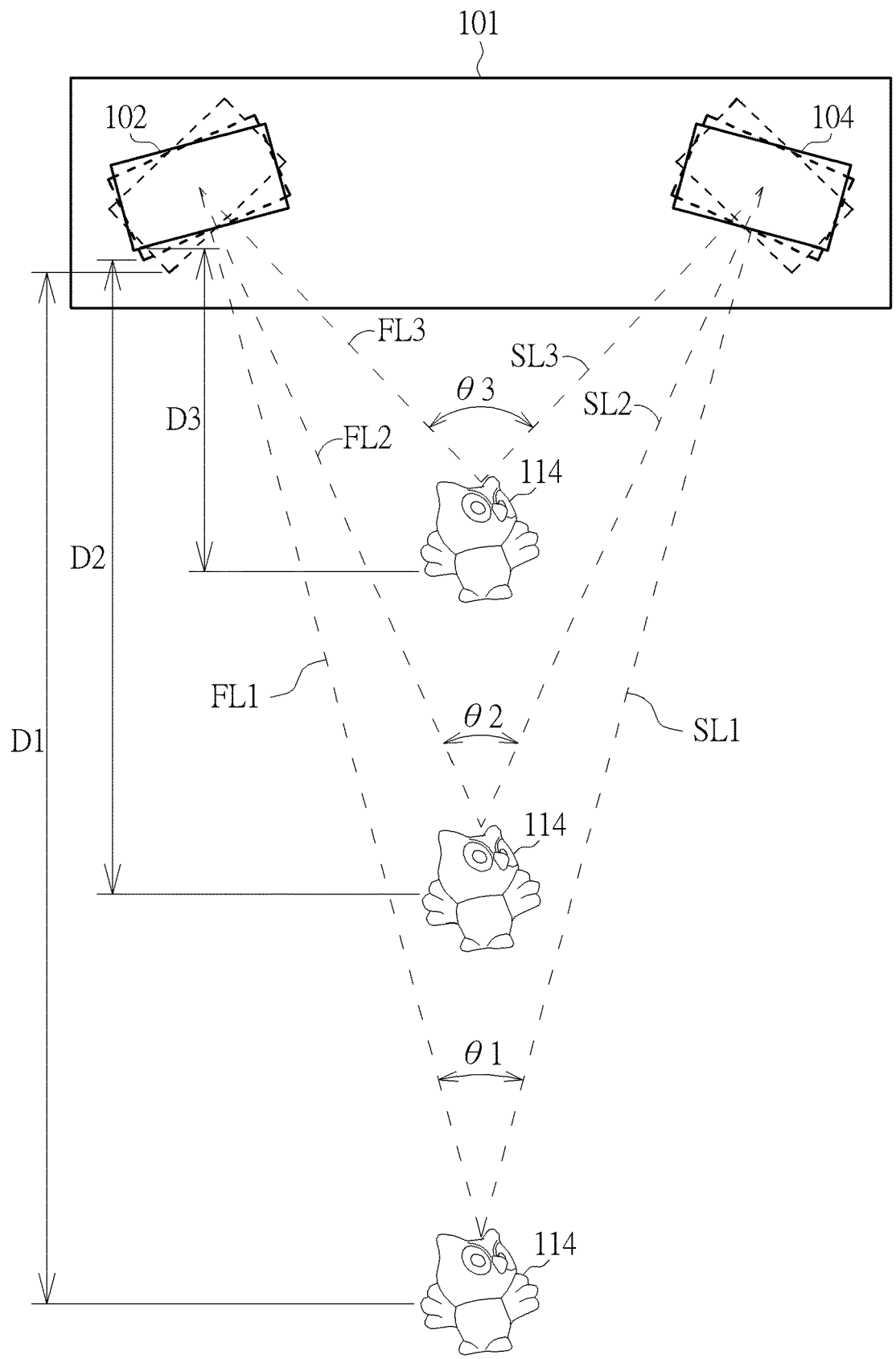
FIG. 6 is a diagram illustrating the first image sensing unit and the second image sensing unit swinging to make the object be always located at an intersection of a line determined by a center of the first image sensing unit and the object and a line determined by a center of the second image sensing unit and the object when a distance between the first image sensing unit and the object is changed with motion or rotation of the object.

Please refer to FIG. 6. FIG. 6 is a diagram illustrating the first image sensing unit 102 and the second image sensing unit 104 swinging to make the object 114 be always located at an intersection of a line determined by a center of the first image sensing unit 102 and the object 114 and a line determined by a center of the second image sensing unit 104 and the object 114 when a distance between the first image sensing unit 102 and the object 114 is changed with motion or rotation of the object 114. As shown in FIG. 6, when a distance D1 exists between the device 100 and the object 114, an angle θ exists between a line FL1 determined by the center of the first image sensing unit 102 and the object 114 and a line SL1 determined by the center of the second image sensing unit 104 and the object 114; when a distance D2 exists between the device 100 and the object 114, an angle θ2 exists between a line FL2 determined by the center of the first image sensing unit 102 and the object 114 and a line SL2 determined by the center of the second image sensing unit 104 and the object 114; and when a distance D3 exists between the device 100 and the object 114, an angle θ3 exists between a line FL3 determined by the center of the first image sensing unit 102 and the object 114 and a line SL3 determined by the center of the second image sensing unit 104 and the object 114. Because when the device 100 scans the object 114, the object 114 can be moved or rotated arbitrarily, a distance between the device 100 and the object 114 can be varied with motion or rotation of the object 114. That is to say, when a distance between the device 100 and the object 114 is varied with motion or rotation of the object 114, the first image sensing unit 102 and the second image sensing unit 104 can be swung to make the object 114 be always located at an intersection of a line determined by the center of the first image sensing unit 102 and the object 114 and a line determined by the center of the second image sensing unit 104 and the object 114. Because the first image sensing unit 102 and the second image sensing unit 104 can be swung, no matter how the object 114 is mover or rotated, the device 100 can always make the object 114 be located at an intersection of a line determined by the center of the first image sensing unit 102 and the object 114 and a line determined by the center of the second image sensing unit 104 and the object 114. In addition, because the first image sensing unit 102 and the second image sensing unit 104 can be swung, compared to the prior art, a size of the object 114 can be less restricted.

Figure 7:
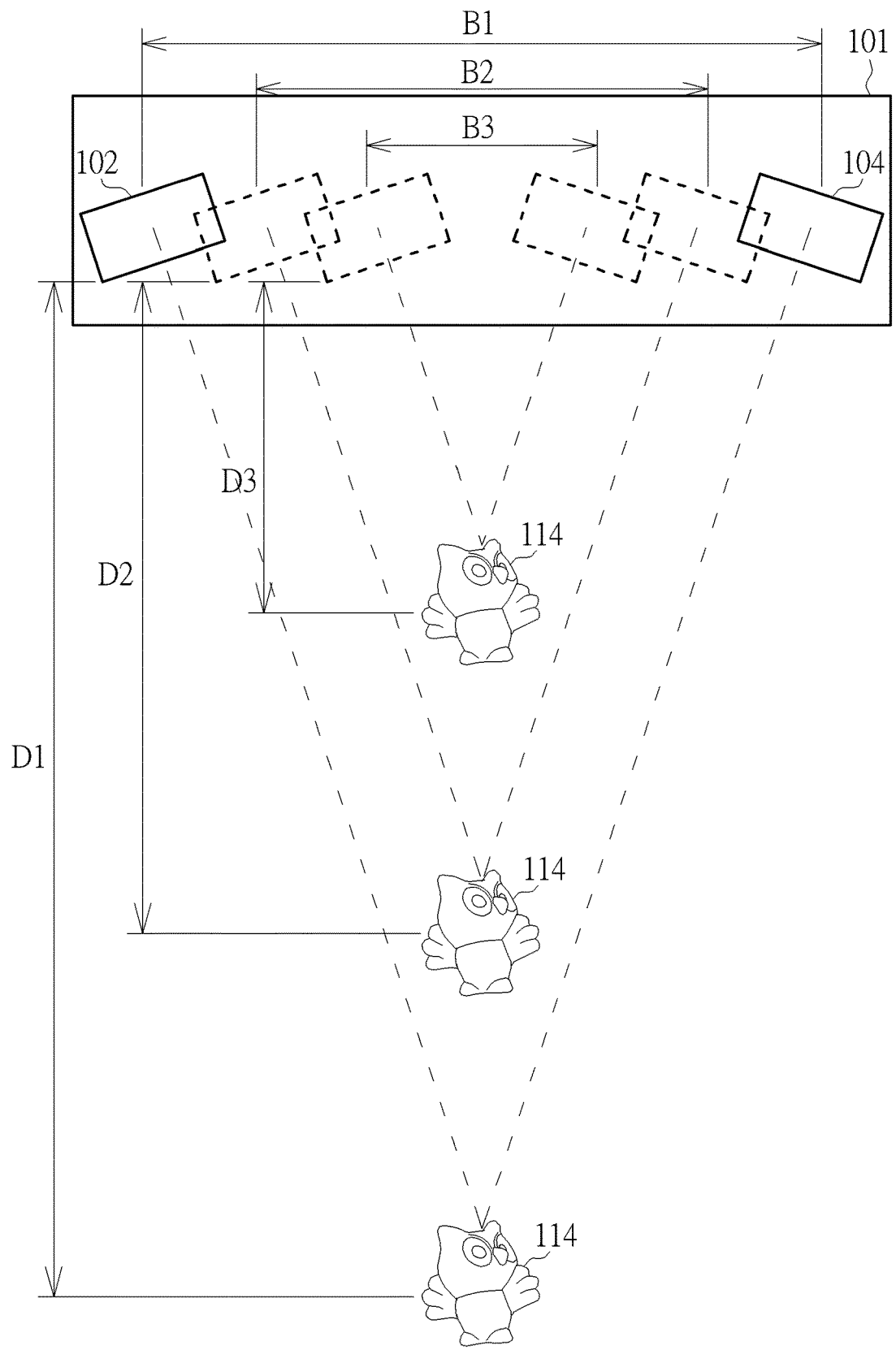
FIG. 7 is a diagram illustrating a baseline between the first image sensing unit and the second image sensing unit being changed with a distance between the first image sensing unit and the object according to another embodiment of the present invention.

Please refer to FIG. 7. FIG. 7 is a diagram illustrating a baseline between the first image sensing unit 102 and the second image sensing unit 104 being changed with a distance between the first image sensing unit 102 and the object 114 according to another embodiment of the present invention. As shown in FIG. 7, when the distance D1 exists between the device 100 and the object 114, a baseline B1 exists between the first image sensing unit 102 and the second image sensing unit 104; when the distance D2 exists between the device 100 and the object 114, a baseline B2 exists between the first image sensing unit 102 and the second image sensing unit 104; and the distance D3 exists between the device 100 and the object 114, a baseline B3 exists between the first image sensing unit 102 and the second image sensing unit 104. As shown in FIG. 7, because a baseline between the first image sensing unit 102 and the second image sensing unit 104 can be varied with a distance between the device 100 and the object 114, no matter how the object 114 is mover or rotated, the device 100 can always make the object 114 be located at an intersection of a line determined by the center of the first image sensing unit 102 and the object 114 and a line determined by the center of the second image sensing unit 104 and the object 114. In addition, because a baseline between the first image sensing unit 102 and the second image sensing unit 104 can be varied with a distance between the device 100 and the object 114, compared to the prior art, the size of the object 114 can be less restricted.

In addition, in another embodiment of the present invention, a baseline between the first image sensing unit 102 and the second image sensing unit 104 can be varied with a distance between the device 100 and the object 114, and the first image sensing unit 102 and the second image sensing unit 104 can also be swung with a distance between the device 100 and the object 114.

Figure 8:
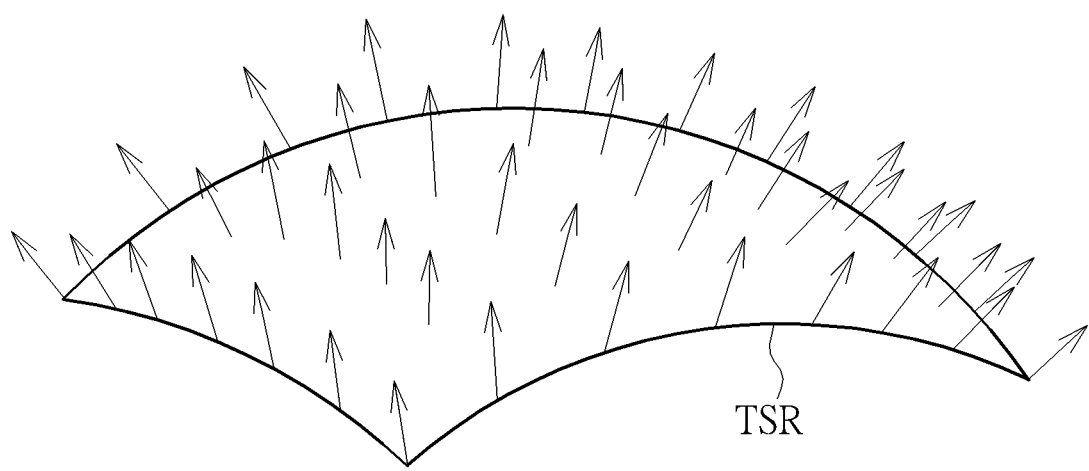
FIG. 8 is a diagram illustrating normal vectors corresponding to points of a part of the original three-dimensional scan result.
Figure 9:
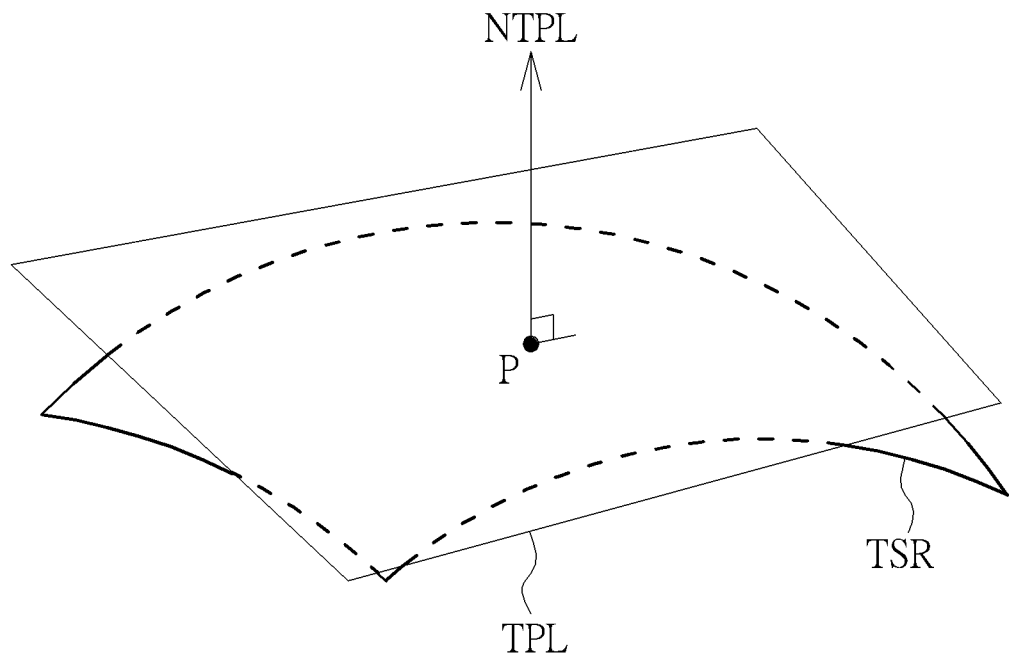
FIG. 9 is a diagram illustrating a point of the original three-dimensional scan result, the tangent plane corresponding to the point, and the normal vector of the tangent plane.

As shown in FIG. 4, the normal vector generation unit 110 is coupled to the image processor 108 for generating a normal vector corresponding to each point of the original three-dimensional scan result TSR according to the each point, a plurality of predetermined points of the original three-dimensional scan result TSR adjacent to the each point, and a Principal Component Analysis (PCA) method provided by the prior art (as shown in FIG. 8, FIG. 8 only shows normal vectors corresponding to points of a part of the original three-dimensional scan result TSR), wherein the plurality of predetermined points of the original three-dimensional scan result TSR are located within a predetermined radius from the each point. That is to say, the normal vector generation unit 110 can utilize the each point, the plurality of predetermined points adjacent to the each point, and the Principal Component Analysis method to determine a tangent plane corresponding to the each point, wherein a normal vector of the tangent plane corresponds to the normal vector of the each point. For example, as shown in FIG. 9, the normal vector generation unit 110 can utilize a point P of the original three-dimensional scan result TSR, a plurality of predetermined points of the original three-dimensional scan result TSR adjacent to the point P, and the Principal Component Analysis method to determine a tangent plane TPL corresponding to the point P, wherein a normal vector NTPL of the tangent plane TPL corresponds to a normal vector of the point P, and the plurality of predetermined points adjacent to the point P are located within a predetermined radius R (not shown in FIG. 9) from the point P. However, although the each point and the plurality of predetermined points adjacent to the each point are used for determining the tangent plane corresponding to the each point, the plurality of predetermined points adjacent to the each point are not all located on the tangent plane corresponding to the each point. In addition, the Principal Component Analysis method is described detailedly in pages 45-46 of a doctoral dissertation "Semantic 3D Object Maps for Everyday Manipulation in Human Living Environments" of Badu Bogdan Rusu, so further description thereof is omitted for simplicity. In addition, the present invention is not limited to the normal vector generation unit 110 utilizing the Principal Component Analysis method to generate the normal vector corresponding to the each point.

Figure 10:
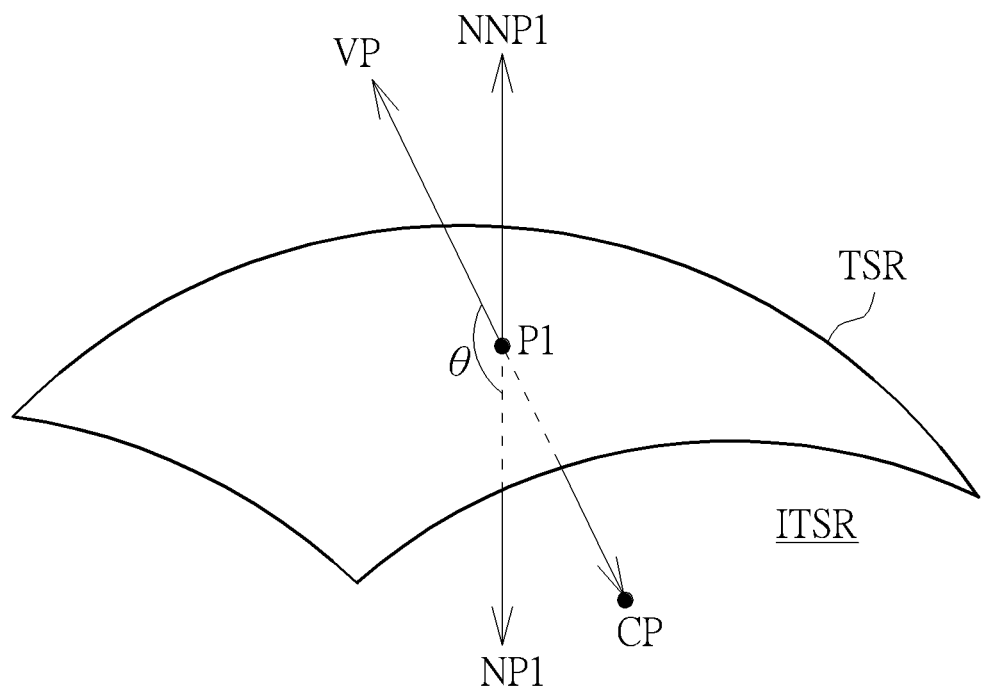
FIG. 10 is a diagram illustrating a point of the inner region of the original three-dimensional scan result, a point of the original three-dimensional scan result, a vector corresponding to the point of the original three-dimensional scan result, a normal vector corresponding to the point of the original three-dimensional scan result, and a reversed normal vector corresponding to the point of the original three-dimensional scan result.
Figure 11:
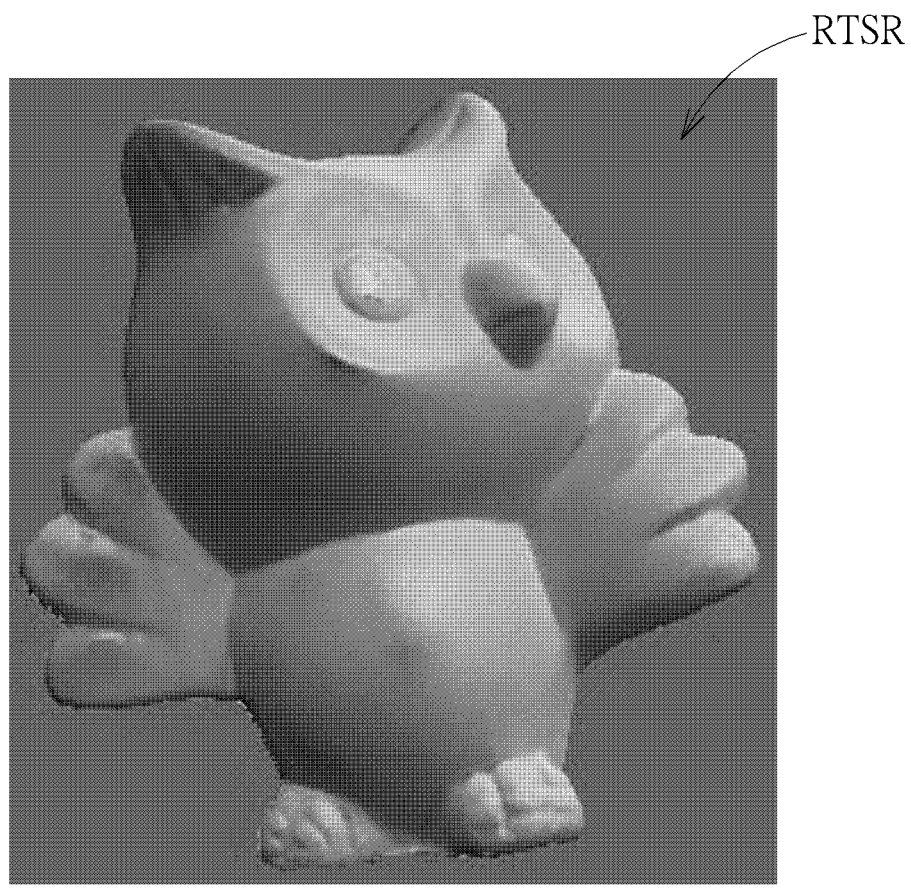
FIG. 11 is a diagram illustrating the corrected three-dimensional scan result.

As shown in FIG. 4, the correction unit 112 is coupled to the normal vector generation unit 110 and the image processor 108 for determining an inner region ITSR of the original three-dimensional scan result TSR according to depth information of the original three-dimensional scan result TSR (for example, as shown in FIG. 5, because the device 100 surrounds the object 114 to scan the object 114, the original three-dimensional scan result TSR corresponds to a surface of the object 114, that is, depth information of the each point of the original three-dimensional scan result TSR corresponds to the surface of the object 114. In one embodiment of the present invention, because the depth information of the each point of the original three-dimensional scan result TSR corresponds to the surface of the object 114, the correction unit 112 can determine the inner region ITSR of the original three-dimensional scan result TSR according to the depth information of the each point of the original three-dimensional scan result TSR), and after the normal vector generation unit 110 generates the normal vector corresponding to the each point of the original three-dimensional scan result TSR, the normal vector generation unit 110 reverses a normal vector corresponding to a point of the original three-dimensional scan result TSR when the normal vector corresponding to the point of the original three-dimensional scan result TSR is toward the inner region ITSR. For example, as shown in FIG. 10, the correction unit 112 can first generate a vector VP corresponding to a point P1 of the original three-dimensional scan result TSR according to a point CP (e.g. a center of the inner region ITSR) of the inner region ITSR of the original three-dimensional scan result TSR and the point P1, wherein a direction of the vector VP is from the point CP to the point P1. When an angle θ between the vector VP and a normal vector NP1 corresponding to the point P1 is greater than 90°, the correction unit 112 determines that the normal vector NP1 corresponding to the point P1 is toward the inner region ITSR, so the correction unit 112 can reverse the normal vector NP1 corresponding to the point P1 to generate a normal vector NNP1. Thus, reflection light corresponding to the point P1 will be correct to show a corresponding color thereof. In addition, the present invention is not limited to the above mentioned method of the correction unit 112 determining that the normal vector NP1 corresponding to the point P1 is toward the inner region ITSR. In addition, after the correction unit 112 corrects wrong normal vectors of the original three-dimensional scan result TSR, the correction unit 112 can generate and output a corrected three-dimensional scan result RTSR (as shown in FIG. 11). For example, the correction unit 112 reverses normal vectors corresponding to a plurality of points of the original three-dimensional scan result TSR, wherein the normal vectors corresponding to the plurality of points are toward the inner region ITSR, the correction unit 112 can generate the corrected three-dimensional scan result RTSR.

In addition, in another embodiment of the present invention, the first image sensing unit 102, the second image sensing unit 104, the depth map generation unit 106, the image processor 108, the normal vector generation unit 110, and the correction unit 112 are integrated into a monolithic chip.

In addition, in another embodiment of the present invention, the device 100 does not include the first image sensing unit 102, the second image sensing unit 104, the depth map generation unit 106, and the image processor 108 (that is, the first image sensing unit 102, the second image sensing unit 104, the depth map generation unit 106, and the image processor 108 are included in a scanner, and the device 100 is coupled to the scanner), so the plurality of depth maps DP1, DP2, DP3, . . . generated by the depth map generation unit 106, the plurality of first images L1, L2, L3, . . . , and the plurality of second images R1, R2, R3, . . . are transmitted to the device 100 through a wired communication interface of a mobile-industry-processor-interface (MIPI) or a universal serial bus (USB), or through a wireless communication interface of a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+). Thereof, the device 100 can generate and output the corrected three-dimensional scan result RTSR according to the original three-dimensional scan result TSR corresponding to the object 114.

In addition, the depth map generation unit 106 can be a field programmable gate array (FPGA) with the above mentioned functions of the depth map generation unit 106, or an application-specific integrated circuit (ASIC) with the above mentioned functions of the depth map generation unit 106, or a software module for executing the above mentioned functions of the depth map generation unit 106; the image processor 108 can be a field programmable gate array with the above mentioned functions of the image processor 108, or an application-specific integrated circuit with the above mentioned functions of the image processor 108, or a software module for executing the above mentioned functions of the image processor 108; the normal vector generation unit 110 can be a field programmable gate array with the above mentioned functions of the normal vector generation unit 110, or an application-specific integrated circuit with the above mentioned functions of the normal vector generation unit 110, or a software module for executing the above mentioned functions of the normal vector generation unit 110; and the correction unit 112 can be a field programmable gate array with the above mentioned functions of the correction unit 112, or an application-specific integrated circuit with the above mentioned functions of the correction unit 112, or a software module for executing the above mentioned functions of the correction unit 112.

Figure 12:
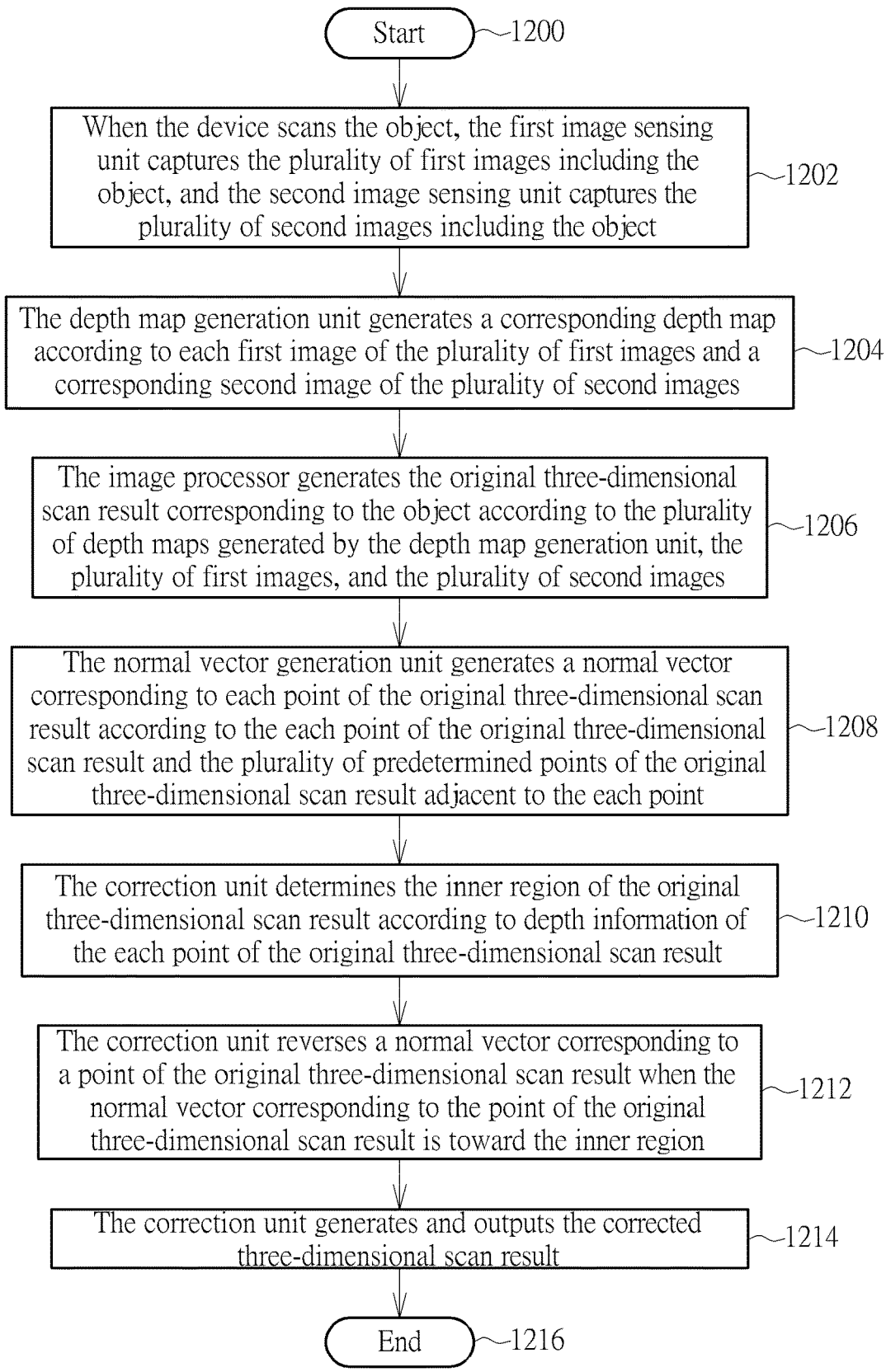
FIG. 12 is a flowchart illustrating a method of correcting wrong normal vectors of an original three-dimensional scan result according to a second embodiment of the present invention.

Please refer to FIGS. 4-11 and FIG. 12. FIG. 12 is a flowchart illustrating a method of correcting wrong normal vectors of an original three-dimensional scan result according to a second embodiment of the present invention. The method in FIG. 12 is illustrated using the device 100 in FIG. 1. Detailed steps are as follows:

Step 1200: Start.

Step 1202: When the device 100 scans the object 114, the first image sensing unit 102 captures the plurality of first images L1, L2, L3, . . . including the object 114, and the second image sensing unit 104 captures the plurality of second images R1, R2, R3, . . . including the object 114.

Step 1204: The depth map generation unit 106 generates a corresponding depth map according to each first image of the plurality of first images L1, L2, L3, . . . and a corresponding second image of the plurality of second images R1, R2, R3, . . . .

Step 1206: The image processor 108 generates the original three-dimensional scan result TSR corresponding to the object 114 according to the plurality of depth maps DP1, DP2, DP3, . . . generated by the depth map generation unit 106, the plurality of first images L1, L2, L3, . . . , and the plurality of second images R1, R2, R3, . . . .

Step 1208: The normal vector generation unit 110 generates a normal vector corresponding to each point of the original three-dimensional scan result TSR according to the each point of the original three-dimensional scan result TSR and the plurality of predetermined points of the original three-dimensional scan result TSR adjacent to the each point.

Step 1210: The correction unit 112 determines the inner region ITSR of the original three-dimensional scan result TSR according to depth information of the each point of the original three-dimensional scan result TSR.

Step 1212: The correction unit 112 reverses a normal vector corresponding to a point of the original three-dimensional scan result TSR when the normal vector corresponding to the point of the original three-dimensional scan result TSR is toward the inner region ITSR.

Step 1214: The correction unit 112 generates and outputs the corrected three-dimensional scan result RTSR.

Step 1216: End.

In Step 1202, when the device 100 scans the object 114 (as shown in FIG. 5, the object 114 is the owl toy), the first image sensing unit 102 captures the plurality of first images L1, L2, L3, . . . including the object 114, and the second image sensing unit 104 captures the plurality of second images R1, R2, R3, . . . including the object 114, wherein each first image (e.g. the first image L1) of the plurality of first images L1, L2, L3, . . . corresponds to a second image (e.g. the second image R1) of the plurality of second images R1, R2, R3, ..., the plurality of first images L1, L2, L3, ... and the plurality of second images R1, R2, R3, ... are RGB images or YUV images, and he plurality of first images L1, L2, L3, ... are left eye images and the plurality of second images R1, R2, R3, ... are right eye images. But, the present invention is not limited to the plurality of first images L1, L2, L3, ... and the plurality of second images R1, R2, R3, ... being RGB images or YUV images. That is to say, the plurality of first images L1, L2, L3, ... and the plurality of second images R1, R2, R3, ... can be other types of color images.

Figure 1:
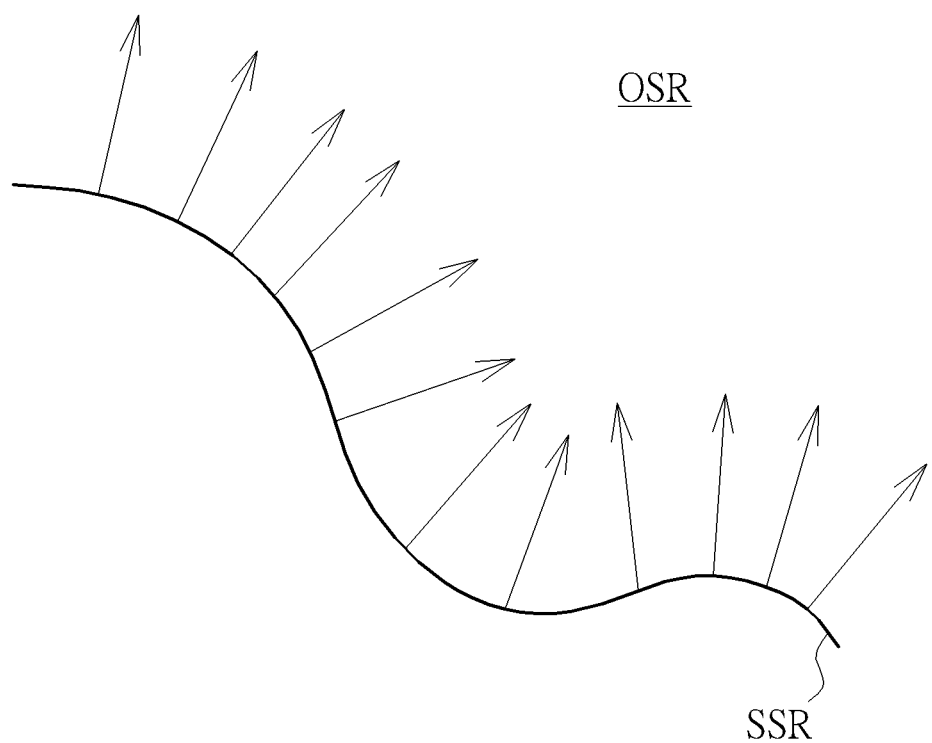
FIG. 1 is a diagram illustrating a normal vector corresponding to each point of a partial cross section of the three-dimensional scan result.
Figure 2:
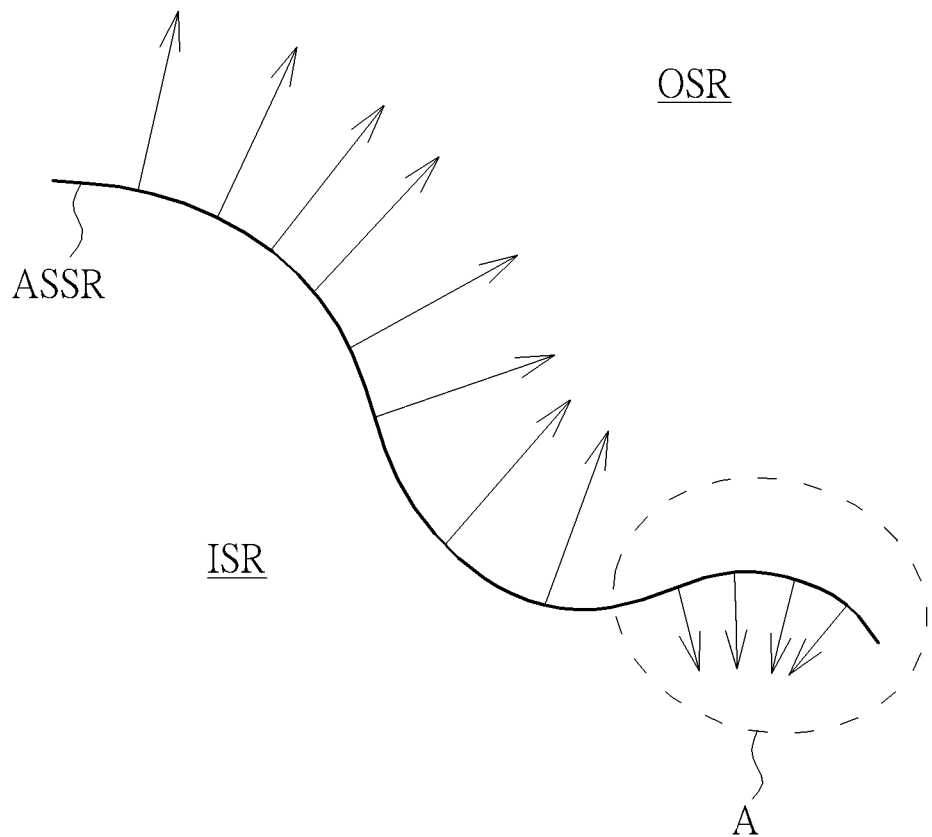
FIG. 2 is a diagram illustrating normal vectors of partial points of another partial cross section of the three-dimensional scan result toward an inner region of the three-dimensional scan result.
Figure 3:
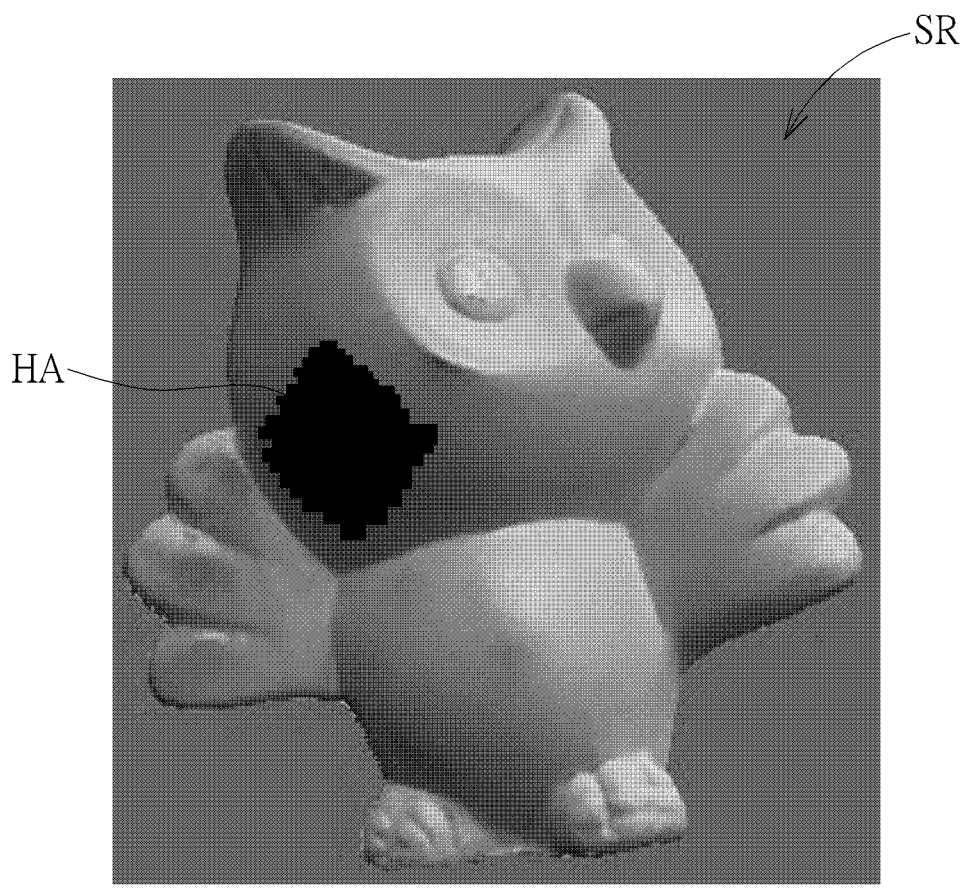
FIG. 3 is a diagram illustrating the region showing a black color when a normal vector of each point of a region of the three-dimensional scan result corresponding to the owl toy is toward the inner region of the three-dimensional scan result.

In Step 1204, as shown in FIG. 1, after the depth map generation unit 106 receives the plurality of first images L1, L2, L3, ... and the plurality of second images R1, R2, R3, ..., the depth map generation unit 106 can process the first image L1 and the second image R1 corresponding to the first image L1 together to generate the depth map DP1. Thus, the depth map generation unit 106 can generate the plurality of depth maps DP1, DP2, DP3, ... according to the plurality of first images L1, L2, L3, ... and the plurality of second images R1, R2, R3, .... As shown in FIG. 5, because the device 100 scans the object 114, the plurality of depth maps DP1, DP2, DP3, ... can correspond to different view angles.

In Step 1206, as shown in FIG. 4, the image processor 108 can generate the original three-dimensional scan result TSR corresponding to the object 114 according to the plurality of first images L1, L2, L3, ..., the plurality of second images R1, R2, R3, ..., and the plurality of depth maps DP1, DP2, DP3, .... But, in another embodiment of the present invention, the image processor 108 generates a part of the original three-dimensional scan result TSR corresponding to the object 114 real time according to each first image (e.g. the first image L1) of the plurality of first images L1, L2, L3, ..., a corresponding second image (e.g. the second image R1) of the plurality of second images R1, R2, R3, ..., and a corresponding depth map (e.g. the depth map DP1).

In addition, as shown in FIG. 6, because when the device 100 scans the object 114, the object 114 can be moved or rotated arbitrarily, a distance between the device 100 and the object 114 can be varied with motion or rotation of the object 114. That is to say, when a distance between the device 100 and the object 114 is varied with motion or rotation of the object 114, the first image sensing unit 102 and the second image sensing unit 104 can be swung to make the object 114 be always located at an intersection of a line determined by the center of the first image sensing unit 102 and the object 114 and a line determined by the center of the second image sensing unit 104 and the object 114, so compared to the prior art, the size of the object 114 can be less restricted.

In addition, in another embodiment of the present invention, as shown in FIG. 7, because a baseline between the first image sensing unit 102 and the second image sensing unit 104 can be varied with a distance between the device 100 and the object 114, no matter how the object 114 is mover or rotated, the device 100 can always make the object 114 be located at an intersection of a line determined by the center of the first image sensing unit 102 and the object 114 and a line determined by the center of the second image sensing unit 104 and the object 114. Therefore, compared to the prior art, the size of the object 114 can be less restricted.

In addition, in another embodiment of the present invention, a baseline between the first image sensing unit 102 and the second image sensing unit 104 can be varied with a distance between the device 100 and the object 114, and the first image sensing unit 102 and the second image sensing unit 104 can also be swung with a distance between the device 100 and the object 114.

In Step 1208, as shown in FIG. 4, normal vector generation unit 110 can generate the normal vector corresponding to the each point according to the each point of the original three-dimensional scan result TSR and the plurality of predetermined points adjacent to the each point (as shown in FIG. 8, FIG. 8 only shows the normal vectors corresponding to points of the part of the original three-dimensional scan result TSR), wherein the plurality of predetermined points of the original three-dimensional scan result TSR are located within a predetermined radius from the each point. In one embodiment of the present invention, the normal vector generation unit 110 can generate the normal vector corresponding to the each point according to the each point, the plurality of predetermined points adjacent to the each point, and the Principal Component Analysis method. For example, as shown in FIG. 9, the normal vector generation unit 110 can utilize the point P of the original three-dimensional scan result TSR, the plurality of predetermined points of the original three-dimensional scan result TSR adjacent to the point P, and the Principal Component Analysis method to determine the tangent plane TPL corresponding to the point P, wherein the normal vector NTPL of the tangent plane TPL corresponds to the normal vector of the point P, and the plurality of predetermined points adjacent to the point P are located within the predetermined radius R (not shown in FIG. 9) from the point P.

In Step 1212, after the normal vector generation unit 110 generates the normal vector corresponding to the each point of the original three-dimensional scan result TSR, the normal vector generation unit 110 reverses the normal vector corresponding to the point of the original three-dimensional scan result TSR when the normal vector corresponding to the point of the original three-dimensional scan result TSR is toward the inner region ITSR. For example, as shown in FIG. 10, the correction unit 112 can first generate the vector VP corresponding to the point P1 of the original three-dimensional scan result TSR according to the point CP (e.g. the center of the inner region ITSR) of the inner region ITSR of the original three-dimensional scan result TSR and the point P1, wherein the direction of the vector VP is from the point CP to the point P1. When the angle θ between the vector VP and the normal vector NP1 corresponding to the point P1 is greater than 90°, the correction unit 112 determines that the normal vector NP1 corresponding to the point P1 is toward the inner region ITSR, so the correction unit 112 can reverse the normal vector NP1 corresponding to the point P1 to generate the normal vector NNP1. Thus, reflection light corresponding to the point P1 will be correct to show the corresponding color thereof. In addition, the present invention is not limited to the above mentioned method of the correction unit 112 determining that the normal vector NP1 corresponding to the point P1 is toward the inner region ITSR. In addition, in Step 1214, after the correction unit 112 corrects the wrong normal vectors of the original three-dimensional scan result TSR, correction unit 112 can generate and output the corrected three-dimensional scan result RTSR (as shown in FIG. 11).

To sum up, the device and the method thereof utilize the normal vector generation unit to generate a normal vector corresponding to each point of the original three-dimensional scan result according to the each point and a plurality of predetermined points adjacent to the each point after the image processor generates the original three-dimensional scan result corresponding to the object, and utilize the correction unit to reverse a normal vector corresponding to a point of the original three-dimensional scan result when the normal vector corresponding to the point is toward the inner region of the original three-dimensional scan result. Thereof, after the correction unit corrects wrong normal vectors of the original three-dimensional scan result, the correction unit can generate and output the corrected three-dimensional scan result. Because the correction unit can correct the wrong normal vectors of the original three-dimensional scan result, compared to the prior art, the present invention can make reflection light of the corrected three-dimensional scan result be correct to show a corresponding color of the corrected three-dimensional scan result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device capable of correcting wrong normal vectors of an original three-dimensional scan result, wherein the original three-dimensional scan result corresponds to an object, the device comprising:
    a normal vector generation circuit generating a normal vector corresponding to each point of the original three-dimensional scan result according to the each point and a plurality of predetermined points adjacent to the each point; and
    a correction circuit coupled to the normal vector generation circuit for determining an inner space of the original three-dimensional scan result according to depth information of the original three-dimensional scan result, and reversing a normal vector corresponding to a point of the original three-dimensional scan result to generate a reverse normal vector when the normal vector corresponding to the point is toward the inner space.

2. The device of claim 1, wherein the plurality of predetermined points are located within a predetermined radius from the each point, the plurality of predetermined points and the each point are used for determining a tangent plane corresponding to the each point, and a normal vector of the tangent plane corresponds to the normal vector of the each point.

3. The device of claim 2, wherein the normal vector generation circuit generates the normal vector corresponding to the each point according to the each point, the plurality of predetermined points, and a Principal Component Analysis (PCA) method.

4. The device of claim 1, further comprising:
    at least two image capturers, wherein when a scanner scans the object, a first image capturer of the at least two image capturers captures a plurality of first images comprising the object and a second image capturer of the at least two image capturers captures a plurality of second images comprising the object, wherein each first image of the plurality of first images corresponds to a second image of the plurality of second images;
    a depth map generation circuit coupled to the at least two image capturers for generating a corresponding depth map according to the each first image and the second image, wherein the depth map generation circuit generates a plurality of depth maps according to the plurality of first images and the plurality of second images; and
    an image processor coupled to the at least two image capturers and the depth map generation circuit for generating the original three-dimensional scan result according to the plurality of first images, the plurality of second images, and the plurality of depth maps.

5. The device of claim 1, wherein the correction circuit generates and outputs a corrected three-dimensional scan result after the correction circuit reverses normal vectors corresponding to a plurality of points of the original three-dimensional scan result, wherein the normal vectors corresponding to the plurality of points are toward the inner space.

6. The device of claim 1, wherein the correction circuit generates a vector corresponding to the point of the original three-dimensional scan result according to a point within the inner space and the point, and when an angle between the vector and the normal vector corresponding to the point is greater than 90°, the correction circuit determines that the normal vector corresponding to the point is toward the inner space.

7. A method of correcting wrong normal vectors of an original three-dimensional scan result, wherein a device applied to the method comprises a normal vector generation circuit and a correction circuit, the method comprising:
    the normal vector generation circuit generating a normal vector corresponding to each point of the original three-dimensional scan result according to the each point and a plurality of predetermined points adjacent to the each point;
    the correction circuit determining an inner space of the original three-dimensional scan result according to depth information of the original three-dimensional scan result;
    the correction circuit reversing a normal vector corresponding to a point of the original three-dimensional scan result to generate a reverse normal vector when the normal vector corresponding to the point is toward the inner space; and
    the correction circuit generating and outputting a corrected three-dimensional scan result after the correction circuit reverses normal vectors corresponding to a plurality of points of the original three-dimensional scan result, wherein the normal vectors corresponding to the plurality of points are toward the inner space.

8. The method of claim 7, wherein the plurality of predetermined points are located within a predetermined radius from the each point, the plurality of predetermined points and the each point are used for determining a tangent plane corresponding to the each point, and a normal vector of the tangent plane corresponds to the normal vector of the each point.

9. The method of claim 8, wherein the normal vector generation circuit generates the normal vector corresponding to the each point according to the each point, the plurality of predetermined points, and a Principal Component Analysis method.

10. The method of claim 7, wherein the correction circuit generates a vector corresponding to the point of the original three-dimensional scan result according to a point within the inner space and the point, and when an angle between the vector and the normal vector corresponding to the point is greater than 90°, the correction circuit determines that the normal vector corresponding to the point is toward the inner space.

11. A device capable of correcting wrong normal vectors of an original three-dimensional scan result, wherein the original three-dimensional scan result corresponds to an object, the device comprising:
    a normal vector generation circuit generating a normal vector corresponding to each point of the original three-dimensional scan result according to the each point and a plurality of predetermined points adjacent to the each point; and a correction circuit coupled to the normal vector generation circuit for determining an inner space of the original three-dimensional scan result, and generating a vector corresponding to a point of the original three-dimensional scan result according to a point within the inner space and the point of the original three-dimensional scan result, wherein when an angle between the vector and a normal vector corresponding to the point of the original three-dimensional scan result is greater than 90°, the correction circuit reverses the normal vector corresponding to the point of the original three-dimensional scan result.

\* \* \* \* \*